United States Patent [19]

Skvarenina

[11] 3,885,261
[45] May 27, 1975

[54] PIPE CUTTING TOOL
[76] Inventor: John Skvarenina, 2639 W. Augusta, Chicago, Ill. 60622
[22] Filed: Apr. 24, 1974
[21] Appl. No.: 463,543

[52] U.S. Cl. .................. 7/14.1 R; 30/102; 30/101
[51] Int. Cl. ........ B25f 1/04; B23b 5/16; B26d 3/16
[58] Field of Search .......... 30/92, 96, 93, 101, 102; 7/14.1 R

[56] References Cited
UNITED STATES PATENTS

| | | | |
|---|---|---|---|
| 2,563,483 | 8/1951 | O'Hagan | 30/102 |
| 3,118,227 | 1/1964 | Sammuels et al. | 30/102 |
| 3,355,749 | 12/1967 | Steffen | 30/102 |
| 3,507,035 | 4/1970 | Mann, Jr. | 30/92 |
| 3,605,266 | 9/1971 | Klapper | 30/102 |

FOREIGN PATENTS OR APPLICATIONS

| | | | |
|---|---|---|---|
| 17,480 | 1881 | United Kingdom | 30/102 |

Primary Examiner—Donald G. Kelly
Assistant Examiner—Roscoe V. Parker
Attorney, Agent, or Firm—Olson, Trexler, Wolters, Bushnell & Fosse, Ltd.

[57] ABSTRACT

The embodiment of the invention disclosed herein is directed to a pipe cutting and cleaning tool for cutting and cleaning round pipe or tubing during a single operation. The pipe cutting tool includes an abrasive member to engage the outer periphery of the pipe immediately adjacent the cut edge formed therethrough. The abrasive member cleans the pipe as the cutting tool is rotated about the pipe. The cleaned pipe is then immediately ready for soldering, brazing, or silver soldering to a coupling or other joint forming member without additional cleaning. The abrasive member is adjustable on a pipe support frame so as to accommodate different diameter pipe. The cutting wheel is secured to a link which has an idler wheel formed at the other end. The link can be reversed to place the idler wheel in contact with the pipe when only a cleaning operation is required.

6 Claims, 4 Drawing Figures

PATENTED MAY 27 1975 3,885,261

PIPE CUTTING TOOL

BACKGROUND OF THE INVENTION

This invention relates generally to improvements in the structure of apparatus used primarily in the field of pipe and tube cutting, and more particularly to a cutting tool and its combination of elements that provides substantial, useful improvements over existing cutting tools now commonly used for cutting pipe and tubing. However, it will be understood that while this invention is directed particularly to devices used for tube cutting, the specific device disclosed herein can be used in other allied fields, such as cutting bar stock or the like.

Heretofore, tube and pipe cutters used in the field of, for example plumbing and heating, for cutting brass and/or copper tubing, have been of the type which are hand-operated. The cutting tool provides a support frame which has the V-notch at one end and a cutting wheel formed opposite the V-notch and secured to a threaded shaft. The cutting wheel is urged against the periphery of a tube or pipe and the frame is rotated about the pipe so as to inscribe a cutting line about the pipe. As the cutting wheel is moved about the periphery of the pipe, it is also urged radially inwardly by the threaded shaft until the entire thickness of the pipe has been severed.

After the pipe or tubing is cut, the periphery immediately adjacent the cut surface is cleaned to accommodate a coupling and to enable solder, braze or silver solder more readily to flow during a connecting operation. This then requires two separate and distinct manual manipulations for cutting and cleaning of the pipe or tube.

SUMMARY OF THE INVENTION

Accordingly, it is an object of this invention to provide a new and improved pipe and tubing cutting tool which simultaneously cuts a length of pipe or tubing while also cleaning the periphery about the pipe or tubing immediately adjacent the severed edge.

Still another object of this invention is to provide a new and improved cutting tool which is simple and inexpensive to manufacture while providing a high degree of reliability and efficiency in use.

Many other objects, features and advantages of this invention will be more fully realized and understood from the following detailed description, when taken in conjunction with the accompanying drawings wherein like reference numerals throughout the various views of the drawings are intended to designate similar elements or components.

DETAILED DESCRIPTION OF THE ILLUSTRATED EMBODIMENT

Figure 1:
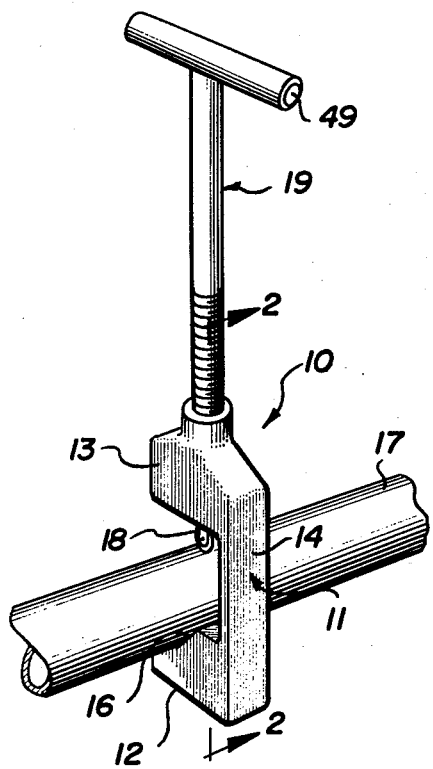
FIG. 1 is a perspective view illustrating a pipe cutting tool constructed in accordance with the principles of this invention and engaging a length of pipe for cutting the same.

Referring now to FIG. 1, there is seen a pipe cutting tool constructed in accordance with the principles of this invention and designated generally by reference numeral 10. The pipe cutting tool 10 has a support frame 11 with first and second spaced apart frame members 12 and 13 extending from a central portion 14. The frame member 11 is substantially C-shaped in configuration and has a V-notch 16 formed at one end thereof to receive a length of pipe 17 before cutting.

Cutting wheel means 18 is secured to one end of an adjustable member 19 and is urged toward the surface of the pipe 17 for cutting. Once the cutting wheel means is engaged with the surface of the pipe, the entire cutting tool is rotated about the pipe so as to inscribe the pipe. Continuous rotating of the cutting tool and urging of the cutting wheel against the pipe ultimately causes severing of the pipe in a well-known manner.

Figure 2:
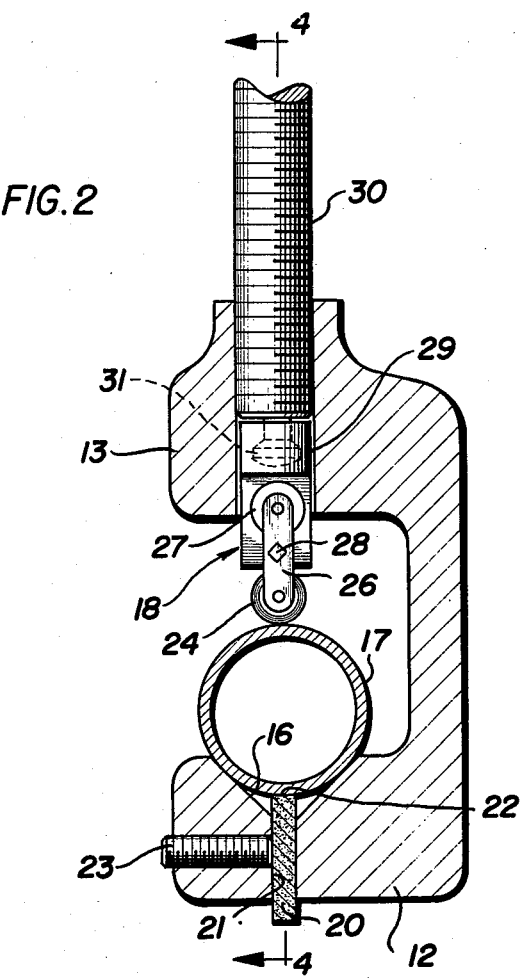
FIG. 2 is a side sectional view taken along line 2—2 of FIG. 1, illustrating the cutting wheel and abrasive member of the cutting tool of this invention.
Figure 3:
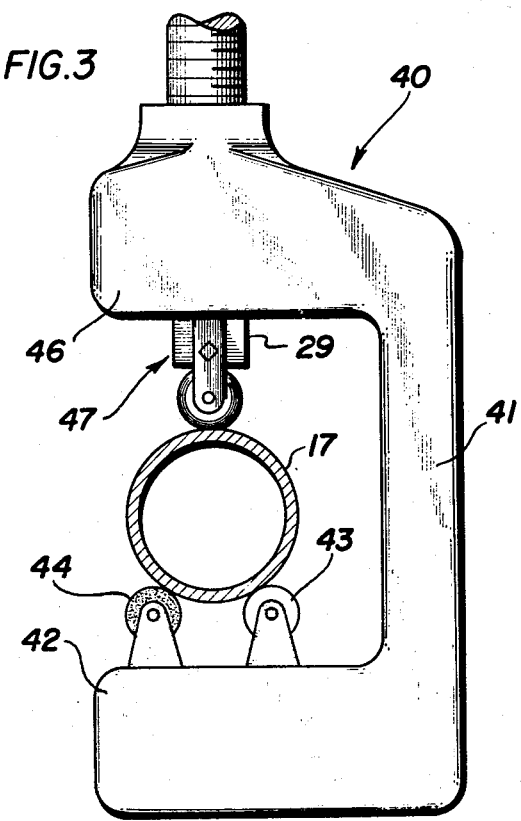
FIG. 3 is an alternate form of a cutting and cleaning tool constructed in accordance with the principles of this invention.
Figure 4:
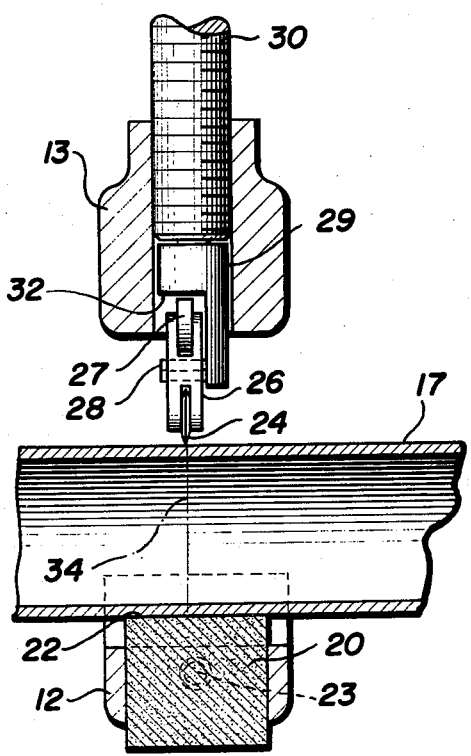
FIG. 4 is a sectional view taken along line 4—4 of FIG. 2.

Most advantageously, the cutting tool of this invention also provides means for cleaning the pipe on opposite sides of the cut edge formed by the cutting wheel means 18. This is best illustrated in FIGS. 2, 3 and 4. FIG. 2 illustrates one embodiment wherein an abrasive bar member 20 extends through a slot 21 formed in the frame member 12 and is adjustable upwardly and downwardly, as seen in the drawings, so as to have the end 22 thereof engage the outer surface of the pipe 17. Once the abrasive bar 20 is in contact with the surface of the pipe, a locking screw 23 is threaded inwardly to firmly hold the abrasive bar in position. Therefore, the abrasive bar will be adjusted upwardly and downwardly at the base of the V-notch 16 to accommodate pipe of different diameters.

The cutting wheel means 18 is formed in such a manner so that only a cleaning operation can be achieved by using the tool of this invention. Therefore, the cutting wheel 24 is secured to one end of a link element 26 while a roller wheel 27 is secured to the other end of the link element 26. The link element 26 engages a rectangular pin 28 and can be removed from a coupling unit 29 by sliding the link off of the rectangular pin when the threaded shaft 30 is sufficiently inwardly of the C-shaped frame member. The link member 26 is then removed and rotated 180° and reapplied to the rectangular pin so that the roller wheel now is exposed. Therefore, the roller wheel will engage the periphery of the pipe when the tool is applied thereto. Rotation of the tool about the pipe will now cause only abrasive polishing or cleaning of the pipe for further use.

As best seen in FIG. 4, the coupling 29 is provided with a recess 32 from which the rectangular pin 28 extends. The link element 26 together with the cutting wheel 24 and roller wheel 27 are captured within the recess. As also illustrated in FIG. 4, the abrasive element 20 is positioned in the frame member 12 to extend on both sides of a cut line formed as indicated by the broken line 34. However, it will be understood that the position of the abrasive element 20 may be only on one side of the cut line if desired.

FIG. 3 illustrates an alternate embodiment of the cutting tool of this invention and is designated generally by reference numeral 40. Here the cutting tool 40 is formed of a frame support member 41 having a first frame portion 42 to receive an idler wheel 43 and an abrasive wheel 44. Diametrically opposed of the frame portion 42 is a frame portion 46 from which extends the cutting tool member 47. The cutting tool member 47 may include a link member and rotor wheel similar to that illustrated in FIGS. 2 and 4. By providing rotor wheels 43 and 44, the need for adjusting of the position of the abrasive member to accommodate different diameter pipe is eliminated and the cutting and cleaning tool of this invention will rotate about the pipe or tubing more easily.

As seen in FIG. 1, the adjusting member 19 includes the threaded shaft 30 from which extends a T-handle member 49. The T-handle may be a fixed handle as illustrated or be a slide bar handle as is well-known in the art.

What has been described is a simple and efficient pipe and tubing cutting tool which also automatically and simultaneously cleans and/or polishes the periphery of the pipe or tubing as it is being cut to make it ready for a subsequent solder, brazing or silver solder coupling operation. Accordingly, variations and modifications may be effected without departing from the spirit and scope of the novel concepts disclosed and claimed herein.

The invention is claimed as follows:

1. A pipe cutting tool for cutting round tubular pipe comprising: a support frame having first and second spaced apart frame members, pipe receptacle means formed in said first frame member, an adjustable member secured to said second frame member for movement toward and away from said pipe receptacle means, cutter means secured to said adjustable member for engaging the outer surface of the pipe or tubing positioned at said pipe receptacle means for cutting thereof when said support frame is rotated about the pipe or tubing and said cutter means is in contact with the outer surface thereof, abrasive means secured to said support frame to be in contact with the outer periphery of the pipe or tube for cleaning the portion of the pipe or tube immediately adjacent the cut made therethrough by said cutting means, and means for removing said cutter means from engagement with the pipe or tubing while maintaining said abrasive means in contact with the pipe or tubing.

2. The pipe cutting tool for cutting tubular pipe as set forth in claim 1, wherein said means for removing said cutter means includes a link member, said cutting means secured to one end of said link member, a roller wheel secured to the other end of said link member, and pin means intermediate said cutting wheel and said roller wheel for securing said link member to said adjusting member with the cutting wheel engaging the pipe or tubing during one instance and for securing said link means to said adjustable member with said roller wheel engaging the pipe or tubing during another instance.

3. The pipe cutting tool for cutting round, tubular pipe as set forth in claim 2, wherein said adjusting means is a threaded shaft having a T-handle formed at one end thereof, a coupling member rotatable relative to said threaded shaft, said coupling member having a recess formed therein, and wherein said pin means is a rectangular pin extending through said link means and securing said link means to said coupling member in said recess.

4. The pipe cutting tool for cutting round, tubular pipe as set forth in claim 1, wherein said pipe receptacle means is in the V-slot formed at said first frame member, said abrasive means being formed of an elongated member extending through an opening at the bottom of said V-slot so as to engage the outer peripheral surface of pipe or tubing secured therein, and lock means extending through said first frame member to hold said abrasive member in a locked position and to enable adjusting of the abrasive member to accommodate different diameter pipe.

5. The pipe cutting tool for cutting round, tubular pipe as set forth in claim 1, wherein said abrasive means is a wheel rotatably secured to an axis and cooperable with an idler wheel spaced therefrom so as to receive a length of pipe or tubing between said abrasive wheel and said idler wheel.

6. The pipe cutting tool for cutting round, tubular pipe as set forth in claim 5, wherein said abrasive wheel and said idler wheel are spaced apart on said first frame member to be displaced on opposite sides of said cutting means extending from said second frame member.

* * * * *